United States Patent
Huang et al.

(10) Patent No.: US 10,999,576 B2
(45) Date of Patent: May 4, 2021

(54) VIDEO PROCESSING METHOD

(71) Applicant: NOVATEK MICROELECTRONICS CORP., HsinChu (TW)

(72) Inventors: Xin Huang, Xi'an (CN); Fan-Di Jou, Zhubei (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 275 days.

(21) Appl. No.: 15/585,422

(22) Filed: May 3, 2017

(65) Prior Publication Data
US 2018/0324426 A1    Nov. 8, 2018

(51) Int. Cl.
| | | |
|---|---|---|
| *H04N 19/124* | (2014.01) |
| *H04N 19/176* | (2014.01) |
| *H04N 19/14* | (2014.01) |
| *H04N 19/137* | (2014.01) |

(52) U.S. Cl.
CPC ......... *H04N 19/124* (2014.11); *H04N 19/137* (2014.11); *H04N 19/14* (2014.11); *H04N 19/176* (2014.11)

(58) Field of Classification Search
CPC ...... H04N 19/00; H04N 19/19; H04N 19/136; H04N 19/137; H04N 19/176; H04N 19/124; H04N 19/14
See application file for complete search history.

(56) References Cited

U.S. PATENT DOCUMENTS

| | | | | |
|---|---|---|---|---|
| 8,094,716 B1 * | 1/2012 | Chen | ...... | H04N 19/147 |
| | | | | 375/240.01 |
| 9,521,410 B2 * | 12/2016 | Seregin | ...... | H04N 19/70 |
| 2008/0031337 A1 * | 2/2008 | Hasegawa | ...... | H04N 19/176 |
| | | | | 375/240.16 |
| 2010/0086029 A1 * | 4/2010 | Chen | ...... | H04N 19/176 |
| | | | | 375/240.12 |
| 2011/0170591 A1 * | 7/2011 | Li | ...... | H04N 19/19 |
| | | | | 375/240.01 |
| 2014/0119432 A1 | 5/2014 | Wang | | |
| 2014/0140396 A1 | 5/2014 | Wang et al. | | |
| 2015/0195575 A1 | 7/2015 | Jeong et al. | | |

(Continued)

FOREIGN PATENT DOCUMENTS

CN    104335583 A    2/2015

OTHER PUBLICATIONS

Thomas Wiegand et al., "Overview of the H.264/AVC Video Coding Standard" IEEE Transactions on Circuits and Systems for Video Technology, vol. 13, No. 7, Jul. 2003.

(Continued)

*Primary Examiner* — Brian T Pendleton
*Assistant Examiner* — Kyle M Lotfi
(74) *Attorney, Agent, or Firm* — McClure, Qualey & Rodack, LLP (57) ABSTRACT

A video processing method includes: an i-th block of a target frame partitioned into a plurality of blocks is received; at least one of a spatial attribute parameter and a temporal attribute parameter of an i-th block of the target frame is determined; and at least one of a delta quantization parameter and a modified Lagrange multiplier is determined according to at least one of the spatial attribute parameter and the temporal attribute parameter, for encoding the i-th block of the target frame.

23 Claims, 3 Drawing Sheets

(56) References Cited

U.S. PATENT DOCUMENTS

2018/0048907 A1* 2/2018 Rusanovskyy ...... H04N 19/503

OTHER PUBLICATIONS

Gary J. Sullivan et al., "Overview of the High Efficiency Video Coding (HEVC) Standard" Pre-Publication Draft, To Appear in IEEE Trans. on Circuits and Systems for Video Technology, Dec. 2012.

Gary J. Sullivan and Thomas Wiegand, "Rate-Distortion Optimization for Video Compression" Draft for submission to IEEE Signal Proc. Magazine, Nov. 1998 issue. Jul. 15, 1998.

* cited by examiner

VIDEO PROCESSING METHOD

TECHNICAL FIELD

The disclosure relates in general to a video processing method adapted to a video encoder.

BACKGROUND

Video systems have been developed to transmit video data over networks. To meet transmission requirements such as bandwidth limitation, video data need to be compressed before the transmission.

Various video encoding techniques such as those described in the standards of H.264, H.265/HEVC or other existing video codec standards have been proposed to make the transmission of video data more efficiently. As seen, improving the performance and efficiency of video encoding techniques is an important issue in this field.

SUMMARY

The disclosure is directed to a video processing method adapted to a video encoder. With the proposed video processing method, the encoding for a target frame partitioned into a plurality of blocks can be adaptively adjusted according to the spatial and/or temporal attributes of the blocks. Further, primary parameters such as delta quantization parameter and Lagrange multiplier used in the video processing flow can be individually and dynamically determined based on at least one of the spatial attribute parameter and the temporal attribute parameter. Therefore, the performance of the video encoder can be improved.

According to an embodiment of the present disclosure, a video processing method adapted to a video encoder is provided. The video processing method includes: an i-th block of a target frame partitioned into a plurality of blocks is received; at least one of a spatial attribute parameter and a temporal attribute parameter of an i-th block of the target frame is determined, wherein the spatial attribute parameter is a logarithmic approximation of a first value associated with the variance of pixel data in the i-th block of the target frame, and the temporal attribute parameter is a logarithmic approximation of a second value associated with the variance of an absolute difference between the pixel data of the i-th block of the target frame and pixel data of a reference block, which is at the same position as the i-th block of the target frame, of a reference frame; and at least one of a delta quantization parameter and a modified Lagrange multiplier is determined according to at least one of the spatial attribute parameter and the temporal attribute parameter, for encoding the i-th block of the target frame.

According to an embodiment of the present disclosure, a video processing method adapted to a video encoder is provided. The video processing method includes: an i-th block of a target frame partitioned into a plurality of blocks is received; a spatial attribute parameter and a temporal attribute parameter of an i-th block of the target frame are determined, wherein the spatial attribute parameter is dependent on the variance of pixel data in the i-th block of the target frame, and the temporal attribute parameter is dependent on the variance of an absolute difference between the pixel data of the i-th block of the target frame and pixel data of a reference block, which is at the same position as the i-th block of the target frame, of a reference frame; and at least one of a delta quantization parameter and a modified Lagrange multiplier is determined according to the spatial attribute parameter and the temporal attribute parameter, for encoding the i-th block of the target frame.

According to an embodiment of the disclosure, a video processing method adapted to a video encoder is provided. The video processing method includes: an i-th block of a target frame partitioned into a plurality of blocks is received; a temporal attribute parameter of an i-th block of the target frame is determined, wherein the temporal attribute parameter is dependent on the variance of an absolute difference between pixel data of the i-th block of the target frame and pixel data of a reference block, which is at the same position as the i-th block of the target frame, of a reference frame; and at least one of a delta quantization parameter and a modified Lagrange multiplier is determined according to the temporal attribute parameter, for encoding the i-th block of the target frame.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
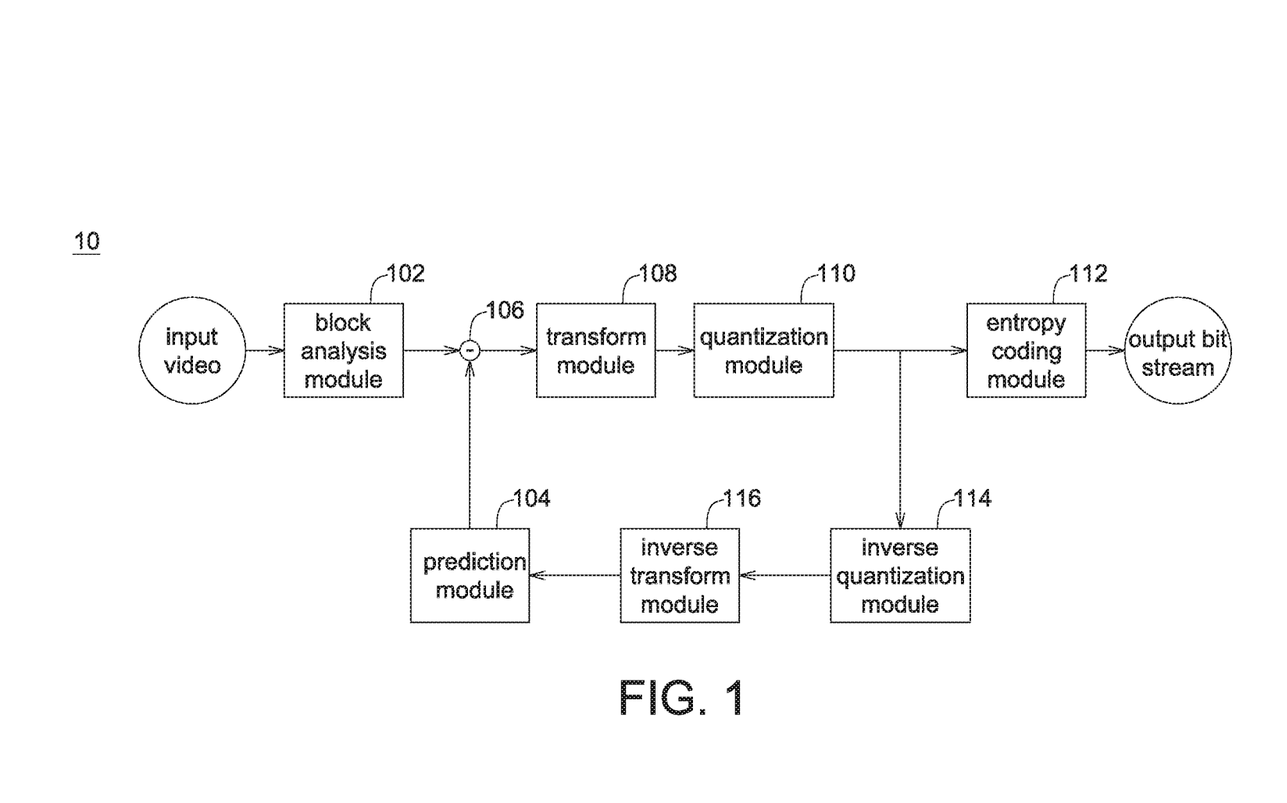
FIG. 1 is a block diagram illustrating a video encoder 10 in accordance with an embodiment of the present disclosure.

FIG. 1 is a block diagram illustrating a video encoder 10 in accordance with an embodiment of the present disclosure.

The video encoder 10 can be realized by hardware, software or the combination thereof. The video encoder 10 may receive an input video and encode it as an output bit stream. The input video may include a number of frames. During the processing of the video encoder 10, each frame of the input video will be divided into a plurality of blocks. In the present disclosure, the term "block" may refer to a macroblock, a coding tree unit (CTU), a coding unit (CU) or any other different but similar pixel subset of a frame. Different sized blocks may be used. For example, the blocks may support flexible sizes from the size of 64×64 pixels to the size of 8×8 pixels.

The video encoder 10 includes a block analysis module 102, a prediction module 104, a comparator 106, a transform module 108, a quantization module 110, and an entropy encoding module 112, an inversed quantization module 114, an inversed transformation module 116.

The block analysis module 102 may analyze the spatial and/or temporal attributes for each block of a target frame in the input video, and determines the respective delta quantization parameters and/or modified Lagrange multipliers of the blocks for encoding. Details of the operation of the block analysis module 102 will be described later in reference to FIG. 2.

The prediction module 104 may select one of a plurality of prediction modes, such as an intra-prediction mode or an inter-prediction mode, for a block of the target frame according to error results, and generate a prediction result with respect to the block accordingly. The prediction result is provided to the comparator 106. The comparator 106 then compares the block with the prediction result to generate residual data.

The transform module 108 may transform the residual data into transformed data using discrete cosine transform (DCT) or similar transform technique. After transformation, the residual data is converted from a pixel domain to a frequency domain, for example.

The quantization module 110 may quantize the transformed data to generate quantized data. The degree of quantization may be adjusted by a quantization step, which is determined according to a quantization parameter adjusted by the delta quantization parameter.

The entropy encoding module 112 may perform entropy encoding, such as syntax-based context-adaptive binary arithmetic coding (SBAC), context adaptive binary arithmetic coding (CABAC), context adaptive variable length coding (CAVLC) or any other suitable entropy encoding technique, on the quantized data to generate the output bit stream. The output bit stream can then be transmitted to a video decoder (not illustrated), for example.

The inversed quantization module 114 and the inversed transformation module 116 may apply inverse quantization and inverse transformation, respectively, to reconstruct the residual data in the pixel domain. The reconstructed residual data can then be provided to the prediction module 104 for mode prediction.

Figure 2:
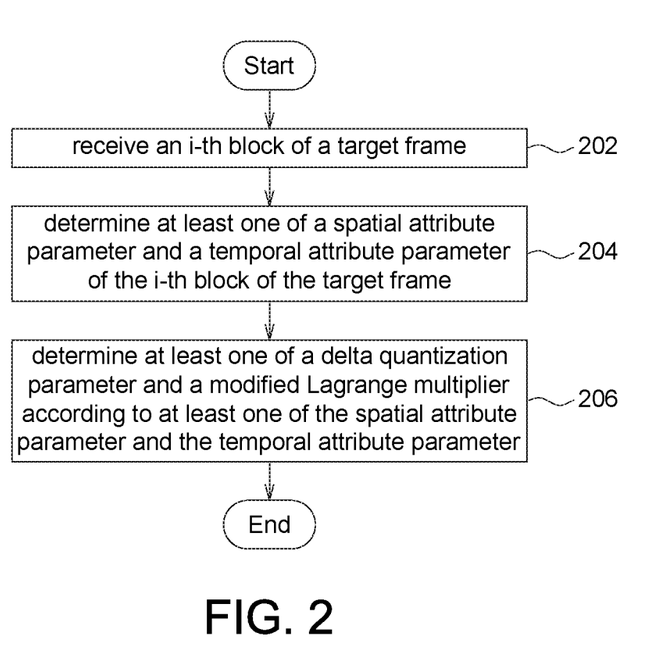
FIG. 2 is a flowchart illustrating detailed operation of the block analysis module in accordance with an embodiment of the present disclosure.

FIG. 2 is a flowchart illustrating detailed operation of the block analysis module 102 in accordance with an embodiment of the present disclosure.

In step 202, the block analysis module 102 receives an i-th block of the target frame.

For example, the target frame is partitioned into M blocks, and the i-th block of the target frame is one of the M blocks that is currently to be processed by the block analysis module 102, where i and M are positive integers, and i≤M.

In step 204, the block analysis module 102 determines at least one of a spatial attribute parameter and a temporal attribute parameter of the i-th block of the target frame.

The spatial attribute parameter is dependent on the variance of pixel data in the i-th block of the target frame, and the temporal attribute parameter is dependent on the variance of an absolute difference between the pixel data of the i-th block of the target frame and pixel data of a reference block, which is at the same position as the i-th block of the target frame, of a reference frame.

The reference frame may be a frame in the input video previous to the target frame in a time sequence. The position of the reference block in the reference frame is the same with the position of the i-th block in the target frame, and both of them have the same block size. For example, if the i-th block is the upper left corner block in the target frame and has a size of 64×64 pixels, the reference block corresponding to the i-th block is also the upper left corner block in the reference frame and has the same size of 64×64 pixels. The target frame is also known as a current frame N, which means a frame currently received and being encoded, and the reference frame is also known as a previous frame (N-1).

In an embodiment, the spatial attribute parameter is a logarithmic approximation of a first value associated with the variance of pixel data in the i-th block of the target frame, and the temporal attribute parameter is a logarithmic approximation of a second value associated with the variance of an absolute difference between the pixel data of the i-th block of the target frame and the pixel data of the reference block of the reference frame.

To determine the spatial attribute parameter of the i-th block of the target frame, the block analysis module 102 may perform arithmetic operations on a value which is determined by searching a look up table (LUT) based on the first value associated with the variance of pixel data in the i-th block of the target frame.

For example, the spatial attribute parameter, $s_i$, of the i-th block of the target frame can be expressed as follows:

$$s_i \approx \log(2\sigma_{x,i}^2 + C_1), \qquad \text{(equation 1)}$$

where $\sigma_{x,i}^2$ is the variance of the pixel data in the i-th block of the target frame, and $C_1$ is a constant.

According to equation 1, the first value can be determined as $2\sigma_{x,i}^2 + C_1$. In such cases, the block analysis module 102 may first calculate the value of $2\sigma_{x,i}^2 + C_1$ (i.e., the first value), then search a look up table (or more than one lookup table) based on the value of $2\sigma_{x,i}^2 + C_1$ to determine a mapping value (or mapping values from different lookup tables), and then calculate the spatial attribute parameter ($s_i$) of the i-th block of the target frame based on the mapping value (or the mapping values).

On the other hand, in an embodiment, the temporal attribute parameter can be determined as a logarithmic approximation of a second value associated with the variance of an absolute difference between the pixel data of the i-th block of the target frame and the pixel data of the reference block of the reference frame.

The block analysis module 102 may determine the temporal attribute parameter of the i-th block of the target frame by performing arithmetic operations on a value which is determined by searching a look up table based on the second value associated with the variance of the absolute difference between the pixel data of the i-th block of the target frame and the pixel data of the reference block of the reference block.

For example, the temporal attribute parameter, $t_i$, of the i-th block of the target frame can be expressed as follows:

$$t_i \approx \log(2\sigma_{x_D,i}^2 + C_2), \qquad \text{(equation 2)}$$

where $\sigma_{x_D,i}^2$ is the variance of the absolute difference between the pixel data of the i-th block of the target frame and the pixel data of the reference block of the reference frame, and $C_2$ is a constant.

According to equation 2, the second value can be determined as $2\sigma_{x_D,i}^2 + C_2$. In such cases, the block analysis module 102 may first calculate the value of $2\sigma_{x_D,i}^2 + C_2$ (i.e., the second value), then search a look up table (or more than one lookup table) based on the value of $2\sigma_{x_D,i}^2 + C_2$ to determine a mapping value (or mapping values from different lookup tables), and then calculate the temporal attribute parameter ($t_i$) of the i-th block of the target frame based on the mapping value (or the mapping values).

It is noted that the formulas of the first value $2\sigma_{x,i}^2 + C_1$ and the second value $2\sigma_{x_D,i}^2 + C_2$ are derived based on a human visual image quality evaluation, such as Structural Similarity Index Measurement (SSIM), which may be more precise to evaluate image distortion. A SSIM value, SSIM(x, y) may be used for comparing image quality difference between two frame images, and determined as follows:

$$SSIM(x, y) = \left(\frac{2\mu_x\mu_y + c_1}{\mu_x^2 + \mu_y^2 + c_1}\right)\left(\frac{2\sigma_{xy} + c_2}{\sigma_x^2 + \sigma_y^2 + c_2}\right) \qquad \text{(equation 3)}$$

where x, y denotes blocks in different frame images and the equation of SSIM(x,y) represents a multiplication result of a luminance index, a contrast index, and a structural correlation index. $u_x$ denotes a mean of pixels value in the x block. $u_y$ denotes a mean of pixels value in the y block. $\sigma_x$ denotes a standard deviation of pixel values in the x block. $\sigma_y$ denotes a standard deviation of pixel values in the y block. $\sigma_{xy}$ denotes the covariance of the pixel values in the x block and the pixel values in the y block. $c_1$, $c_2$ are constants. In the above example, when the luminance index $(2u_x u_y + c_1/u_x^2 + u_y^2 + c_1)$ is assumed to be 1, $\sigma_{xy}$ is assumed to be the same as $\sigma_x^2$, and $\sigma_y^2$ is assumed to be $\sigma_x^2$ plus a minimum square error (MSE), SSIM(x,y) may be expressed instead:

$$SSIM(x, y) = \frac{2\sigma_x^2 + c_2}{2\sigma_x^2 + MSE + c_2} \quad \text{(equation 4)}$$

Based on the equation 4, it may be regarded that $(2\sigma_x^2 + c_2)$ is strongly related to human visual perception. Thus, the spatial attribute parameter and the temporal attribute parameter are respectively determined based on the first value and the second value which are generated based on the $2\sigma_x^2 + c_2$.

In step 206, the block analysis module 102 determines at least one of the delta quantization parameter and the modified Lagrange multiplier according to at least one of the spatial attribute parameter and the temporal attribute parameter.

In an embodiment, the block analysis module 102 determines the delta quantization parameter based on at least one of (1) a difference between the spatial attribute parameter ($s_i$) of the i-th block of the target frame and a global spatial attribute parameter of the target frame and (2) a difference between the temporal attribute parameter ($t_i$) of the i-th block of the target frame and a global temporal attribute parameter of the target frame.

The global spatial attribute parameter can be determined by an average of spatial attribute parameters of all blocks of the target frame. For example, the global spatial attribute parameter, $\bar{s}$, can be expressed as follows:

$$\bar{s} = \frac{1}{M}\sum_{i=1}^{M} s_i, \quad \text{(equation 5)}$$

where M is the total number of the bocks in the target frame.

Likewise, the global temporal attribute parameter can be determined by an average of temporal attribute parameters of all blocks of the target frame, which is expressed as:

$$\bar{t} = \frac{1}{M}\sum_{i=1}^{M} t_i, \quad \text{(equation 6)}$$

In an embodiment, the delta quantization parameter, $\Delta QP_i$, of the i-th block of the target frame can be expressed as:

$$\Delta QP_i = \frac{a\bar{s}(s_i - \bar{s}) + b\bar{t}(t_i - \bar{t})}{\bar{s} + \bar{t}}, \quad \text{(equation 7)}$$

where $\bar{s}$ is the global spatial attribute parameter of the target frame, $\bar{t}$ is the global temporal spatial attribute parameter of the target frame, and a and b are constants.

The values of the constants a and b can be arbitrary, depending on which of the spatial attribute and the temporal attribute of the i-th block of the target frame would be emphasized during the quantization. For example, if only the temporal attribute of the i-th block of the target frame needs to be emphasized, a is set to zero, and thus the delta quantization parameter, $\Delta QP_i$, of the i-th block of the target frame is changed to:

$$\Delta QP_i = \frac{b\bar{t}(t_i - \bar{t})}{\bar{t}}. \quad \text{(equation 8-1)}$$

In such instance, the delta quantization parameter ($\Delta QP_i$) is determined by the temporal attribute parameter ($t_i$) of the i-th block of the target frame.

In another example, if only the spatial attribute of the i-th block of the target frame needs to be emphasized, b is set to zero, and thus the delta quantization parameter, $\Delta QP_i$, of the i-th block of the target frame is changed to:

$$\Delta QP_i = \frac{a\bar{s}(s_i - \bar{s})}{\bar{s}}. \quad \text{(equation 8-2)}$$

In an embodiment, the values of the constants a and b are ranged from 0 to 1, and a+b=1.

Once the delta quantization parameter ($\Delta QP_i$) of the i-th block of the target frame is determined, a corresponding quantization parameter $QP_i$ is determined. The quantization parameter $QP_i$ can be expressed as follows:

$$QP_i = \Delta QP_i + QP_{BASE}, \quad \text{(equation 9)}$$

where $QP_{BASE}$ is a base quantization parameter which may be a preconfigured value. After the quantization parameter $QP_i$ is determined, by searching a lookup table or a relationship curve based on the quantization parameter $QP_i$, a corresponding quantization step of the i-th block of the target frame may be determined.

On the other hand, the block analysis module 102 may determine the modified Lagrange multiplier, $\lambda_i$, for the i-th block of the target frame to be as a linear combination of an original Lagrange multiplier multiplied by a spatial weighting factor of the i-th block of the target frame and the original Lagrange multiplier multiplied by a temporal weighting factor of the i-th block of the target frame, which can be expressed as:

$$\lambda_i = a \times w_{si} \times \lambda_{0i} + b \times w_{ti} \times \lambda_{0i}, \quad \text{(equation 10)}$$

where $\lambda_{0i}$ is the original Lagrange multiplier which can be determined by the quantization parameter $QP_{0i}$ by using a mapping table, $w_{si}$ is the spatial weighting factor, $w_{ti}$ is the temporal weighting factor, and a and b are constants.

As discussed above, if only the temporal attribute parameter ($t_i$) of the i-th block of the target frame is considered, a is set to zero, and the modified Lagrange multiplier, $\lambda_i$, of the i-th block of the target frame is changed to:

$$\lambda_i = b \times w_{ti} \times \lambda_{0i}. \quad \text{(equation 11-1)}$$

On the contrary, if only the spatial attribute parameter ($s_i$) of the i-th block of the target frame is considered, b is set to zero, and the modified Lagrange multiplier, $\lambda_i$, of the i-th block of the target frame is changed to:

$$\lambda_i = a \times w_{si} \times \lambda_{0i}. \quad \text{(equation 11-2)}$$

In an embodiment, the spatial weighting factor, $w_{si}$, can be determined as:

$$w_{si} = \frac{k_1 \sigma_{x,i}^2 + C_1'}{\exp(\bar{s})}, \quad \text{(equation 12)}$$

where $\bar{s}$ is the global spatial attribute parameter of the target frame, $\sigma_{x,i}^2$ is the variance of the pixel data in the i-th block of the target frame, and $k_1$ and $C_1'$ are constants.

Further, the temporal weighting factor, $w_{ti}$, can be determined as:

$$w_{ti} = \frac{k_2 \sigma_{xD,i}^2 + C_2'}{\exp(\bar{t})}, \quad \text{(equation 13)}$$

where $\bar{t}$ is the global temporal attribute parameter of the target frame, $\sigma_{xD,i}^2$ is the variance of an absolute difference between the pixel data of the i-th block of the target frame and the pixel data of the reference block of the reference frame, and $k_2$ and $C_2'$ are constants.

For each block, or called coding tree unit (as the largest CU), the video encoder 10 may perform rate distortion optimization (RDO) which is a process calculating a cost function for different coding unit partition types and determining an optimal coding unit partition type which leads to the minimum of the cost function. The cost function can be expressed as follows:

$$J = D + \lambda R, \quad \text{(equation 14)}$$

where J is joint cost, D is distortion representing the prediction error, usually measured as sum of squared error (SSE) or sum of absolute difference (SAD), R is the number of bits associated to a motion vector to be encoded, and $\lambda$ is the Lagrange multiplier.

When calculating the cost function, the video encoder 10 may replace the Lagrange multiplier ($\lambda$) in the cost function with the modified Lagrange multiplier ($\lambda_i$) (e.g., those expressed in equation 10/11-1/11-2, and select one of a plurality of coding unit partition types for the i-th block (as a coding tree unit, such as 64*64 pixels) of the target frame which leads to minimize the joint cost (J).

Once the optimal coding unit partition type of the i-th block is determined, the i-th block partitioned based on the optimal partition type are then encoded by the entropy encoding module 112.

Figure 3:
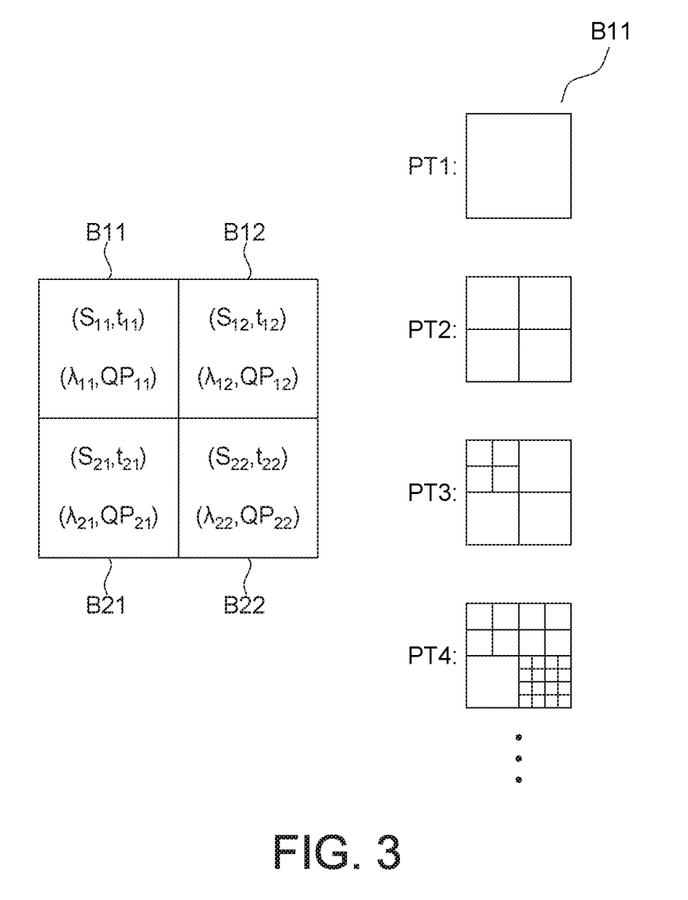
FIG. 3 illustrates a partition type selection process for a target frame.

FIG. 3 illustrates a coding unit partition type selection process for a target frame.

In FIG. 3, the target frame is exemplified as including four blocks B11, B12, B21 and B22 which may be the largest CU (or called CTU). When the target frame is processed by the block analysis module (e.g., the block analysis module 102), each block's spatial attribute parameter and temporal attribute parameter are determined. As shown in FIG. 3, the spatial attribute parameters for the blocks B11, B12, B21 and B22 are $s_{11}$, $s_{12}$, $s_{21}$ and $s_{22}$, respectively, and the temporal attribute parameters for the blocks B11, B12, B21 and B22 are $t_{11}$, $t_{12}$, $t_{21}$ and $t_{22}$, respectively.

For each block B11, B12, B21, B22 in the target frame, the delta quantization parameter and the modified Lagrange multiplier can be determined by the corresponding spatial attribute parameter and temporal attribute parameter. Since the quantization parameter is obtained based on the base quantization parameter and the delta quantization parameter, the quantization parameter may be also regarded as being determined by the corresponding spatial attribute parameter and temporal attribute parameter.

For example, the quantization parameter $QP_{11}$ and the modified Lagrange multiplier $\lambda_{11}$ of the block B11 can be determined by the spatial attribute parameter $s_{11}$ and the temporal attribute parameter $t_{11}$ using the equations 9 and 10. Likewise, the quantization parameter $QP_{12}$ and the modified Lagrange multiplier $\lambda_{12}$ of the block B12 can be determined by the spatial attribute parameter $s_{12}$ and the temporal attribute parameter $t_{12}$; the quantization parameter $QP_{21}$ and the modified Lagrange multiplier $\lambda_{21}$ of the block B21 can be determined by the spatial attribute parameter $s_{21}$ and the temporal attribute parameter $t_{21}$; and the quantization parameter $QP_{22}$ and the modified Lagrange multiplier $\lambda_{22}$ of the block B22 can be determined by the spatial attribute parameter $s_{22}$ and the temporal attribute parameter $t_{22}$.

Moreover, for each of blocks B11, B12, B21, B22, joint costs with respect to different coding unit partition types may be calculated according to the cost function (as equation 14), based on the corresponding modified Lagrange multiplier of to the block. As shown in FIG. 3, to the block B11, four types among a plenty of candidate coding unit partition types, denoted by PT1, PT2, PT3 and PT4, are illustrated as examples. Joint costs are respectively calculated for the candidate coding unit partition types by using the modified Lagrange multiplier $\lambda_{11}$. Given an exemplary result that the coding unit partition type PT4 is corresponding to the minimum joint cost among all the calculated joint costs, the video encoder 10 may select the coding unit partition type PT4 as the optimal coding unit partition type for encoding the block B11. The selection for the optimal partition type for other blocks B12, B21 and B22 can be done through the same way.

Based on the above, a video processing method adapted to a video encoder is provided. With the proposed video processing method, the encoding for a target frame partitioned into a plurality of blocks as a plurality of coding tree units (CTUs) can be adaptively adjusted according to the spatial and/or temporal attribute parameters with respect to the blocks. Further, delta quantization parameter (or quantization parameter) and Lagrange multiplier used in the video processing flow can be individually and dynamically determined based on at least one of the spatial attribute parameter and the temporal attribute parameter. Therefore, the performance of the video encoder can be improved. It is noted that before a block is encoded by entropy coding, not only the optimal coding unit partition type but also an optimal prediction unit (PU) partition type and an optimal transform unit (TU) partition type are determined, by calculating the cost function for different PU partition types and different TU partition types and selecting a PU partition type which leads to the minimum cost and a TU partition type which leads to the minimum cost. The delta quantization parameter or the quantization parameter, and the Lagrange multiplier (as the modified Lagrange multiplier in the above examples) may influence not only which CU partition type to be selected but also which PU partition type and TU partition type to be selected.

In another embodiment, the delta quantization parameter ($\Delta QP$) and the modified Lagrange multiplier ($\lambda_i$) is determined according to both of the spatial attribute parameter and the temporal attribute parameter. In such an embodiment, the spatial attribute parameter ($s_i$) of the i-th block of a target frame may be dependent on the variance ($\sigma_{x,i}^2$) of pixel data in the i-th block and may be not necessary to be an logarithmic approximation associated with the variance of pixel data in the i-th block; and similarly, the temporal attribute parameter ($t_i$) of the i-th block of a target frame may be dependent on the variance ($\sigma_{xD,i}^2$) of an absolute difference between the pixel data of the i-th block of the target frame and pixel data of a reference block in a reference frame, and the temporal attribute parameter may be not necessary to be as a logarithmic approximation associated with the variance of the absolute difference between the pixel data of the i-th block of the target frame and pixel data of the reference block.

In still another embodiment, the delta quantization parameter ($\Delta QP$) and the modified Lagrange multiplier ($\lambda_i$) is determined according to only the temporal attribute parameter ($t_i$), without the spatial attribute parameter. In such an embodiment, the temporal attribute parameter of the i-th block of a target frame may be dependent on the variance ($\sigma_{xD,i}^2$) of an absolute difference between the pixel data of the i-th block of the target frame and pixel data of a reference block in a reference frame, and the temporal attribute parameter may be not necessary to be as a logarithmic approximation associated with the variance of the absolute difference between the pixel data of the i-th block of the target frame and pixel data of the reference block.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A video processing method, adapted to a video encoder, comprising:
    receiving an i-th block of a target frame partitioned into M blocks;
    determining at least one of a spatial attribute parameter and a temporal attribute parameter of an i-th block of the target frame in a pixel domain, wherein the spatial attribute parameter is a logarithmic approximation of a first value associated with a variance of pixel data in the i-th block of the target frame, and the temporal attribute parameter is a logarithmic approximation of a second value associated with a variance of an absolute difference between the pixel data of the i-th block of the target frame and pixel data of a reference block, which is at the same position as the i-th block of the target frame, of a reference frame; and
    determining a modified Lagrange multiplier according to at least one of the spatial attribute parameter and the temporal attribute parameter in the pixel domain, for encoding the i-th block of the target frame, wherein i and M are positive integers, and i is smaller than or equivalent to M, wherein the modified Lagrange multiplier, $\lambda_i$, is determined as a linear combination of the original Lagrange multiplier, $\lambda$, multiplied by a spatial weighting factor, $w_s$, of the i-th block of the target frame and the original Lagrange multiplier, $\lambda$, multiplied by a temporal weighting factor, $w_t$, of the i-th block of the target frame, as $\lambda_i = a*w_s*\lambda + b*w_t*\lambda$, wherein a and b are constants,
    wherein the spatial weighting factor, $w_s$, is determined according to a variance of the pixel data in the i-th block of the target frame and a global spatial attribute parameter being determined by an average of spatial attribute parameters of the M blocks of the target frame, and
    wherein the temporal weighting factor, $w_t$, is determined according to the variance of the absolute difference and a global temporal attribute parameter being determined by an average of temporal attribute parameters of the M blocks of the target frame.

2. The video processing method according to claim 1, wherein determining at least one of the spatial attribute parameter and the temporal attribute parameter of the i-th block of the target frame comprises:
    determining the spatial attribute parameter of the i-th block of the target frame by performing arithmetic operations on a value, wherein the value is determined by searching a look up table based on the first value.

3. The video processing method according to claim 1, wherein determining at least one of the spatial attribute parameter and the temporal attribute parameter of the i-th block of the target frame comprises:
    determining the temporal attribute parameter of the i-th block of the target frame by performing arithmetic operations on a value, wherein the value is determined by searching a look up table based on the second value.

4. The video processing method according to claim 1, further comprising a step of:
    determining a delta quantization parameter based on at least one of
    (1) a difference between the spatial attribute parameter of the i-th block of the target frame and the global spatial attribute parameter and
    (2) a difference between the temporal attribute parameter of the i-th block of the target frame and the global temporal attribute parameter.

5. The video processing method according to claim 4, wherein the delta quantization parameter, $\Delta QP$, is determined as:

$$\Delta QP = \frac{a\bar{s}(s_i - \bar{s}) + b\bar{t}(t_i - \bar{t})}{\bar{s} + \bar{t}},$$

where $\bar{s}$ is the global spatial attribute parameter, $\bar{t}$ is the global temporal spatial attribute parameter, $s_i$ is the spatial attribute parameter of the i-th block of the target frame, and $t_i$ is the temporal attribute parameter of the i-th block of the target frame.

6. The video processing method according to claim 1, further comprising:
    comparing the i-th block of the target frame with a prediction result with respect to the i-th block of the target frame to generate residual data for the i-th block;
    transforming the residual data into transformed data;
    quantizing the transformed data by using a quantization step to generate quantized data, wherein the quantization step is determined according to a quantization parameter adjusted by a delta quantization parameter; and
    performing entropy encoding on the quantized data to generate output data of the video encoder.

7. The video processing method according to claim 1, wherein the spatial weighting factor, $w_s$, is determined as $$w_s = \frac{k_1 \sigma_{x,i}^2 + c_1}{\exp(\bar{s})},$$

where $\bar{s}$ is the global spatial attribute parameter, $\sigma_{x,i}^2$ is the variance of the pixel data in the i-th block of the target frame, and $k_1$ and $c_1$ are constants; and wherein the temporal weighting factor, $w_t$, is determined as $$w_t = \frac{k_2 \sigma_{xD,i}^2 + c_2}{\exp(\bar{t})},$$

where $\bar{t}$ is the global temporal attribute parameter $\sigma_{xD,i}^2$ is the variance of the absolute difference, and $k_2$ and $c_2$ are constants.

8. The video processing method according to claim 1, further comprising:
   selecting a partition type for the i-th block of the target frame according to the modified Lagrange multiplier before the i-th block of the target frame is encoded.

9. A video processing method, adapted to a video encoder, comprising:
   receiving an i-th block of a target frame partitioned into M blocks;
   determining a spatial attribute parameter and a temporal attribute parameter of an i-th block of the target frame in a pixel domain, wherein the spatial attribute parameter is dependent on a variance of pixel data in the i-th block of the target frame, and the temporal attribute parameter is dependent on a variance of an absolute difference between the pixel data of the i-th block of the target frame and pixel data of a reference block, which is at the same position as the i-th block of the target frame, of a reference frame; and
   determining a modified Lagrange multiplier according to the spatial attribute parameter and the temporal attribute parameter in the pixel domain, for encoding the i-th block of the target frame, wherein i and M are positive integers, and i is smaller than or equivalent to M, wherein
   the modified Lagrange multiplier, $\lambda_i$, is determined as a linear combination of the original Lagrange multiplier, $\lambda$, multiplied by a spatial weighting factor, $w_s$, of the block of the target frame and the original Lagrange multiplier, $\lambda$, multiplied by a temporal weighting factor, $w_t$, of the i-th block of the target frame, as $\lambda_i = a*w_s*\lambda + b*w_t*\lambda$, wherein a and b are constants;
   wherein the spatial weighting factor, $w_s$, is determined according to a variance of the pixel data in the i-th block of the target frame and a global spatial attribute parameter being determined by an average of spatial attribute parameters of the M blocks of the target frame, and
   wherein the temporal weighting factor, $w_t$, is determined according to the variance of the absolute difference and a global temporal attribute parameter being determined by an average of temporal attribute parameters of the M blocks of the target frame.

10. The video processing method according to claim 9, wherein determining the spatial attribute parameter of the i-th block of the target frame comprises:
    determining the spatial attribute parameter of the i-th block of the target frame by performing arithmetic operations on a value, wherein the value is determined by searching a look up table based on a first value associated with the variance of pixel data in the i-th block of the target frame;
    wherein the spatial attribute parameter is a logarithmic approximation of the first value.

11. The video processing method according to claim 9, wherein determining the temporal attribute parameter of the i-th block of the target frame comprises:
    determining the temporal attribute parameter of the i-th block of the target frame by performing arithmetic operations on a value, wherein the value is determined by searching a look up table based on a second value associated with the variance of the absolute difference;
    wherein the temporal attribute parameter is a logarithmic approximation of the second value.

12. The video processing method according to claim 9, further comprising a step of:
    determining a delta quantization parameter based on at least one of
    (1) a difference between the spatial attribute parameter of the i-th block of the target frame and the global spatial attribute parameter and
    (2) a difference between the temporal attribute parameter of the i-th block of the target frame and the global temporal attribute parameter.

13. The video processing method according to claim 12, wherein the delta quantization parameter, $\Delta QP$, is determined as:

$$\Delta QP = \frac{a\bar{s}(s_i - \bar{s}) + b\bar{t}(t_i - \bar{t})}{\bar{s} + \bar{t}},$$

where $\bar{s}$ is the global spatial attribute parameter, $\bar{t}$ is the global temporal attribute parameter, $s_i$ is the spatial attribute parameter of the i-th block of the target frame, and $t_i$ is the temporal attribute parameter of the i-th block of the target frame.

14. The video processing method according to claim 9, further comprising:
    comparing the i-th block of the target frame with a prediction result with respect to the i-th block of the target frame to generate residual data for the i-th block;
    transforming the residual data into transformed data;
    quantizing the transformed data by using a quantization step to generate quantized data, wherein the quantization step is determined according to a quantization parameter adjusted by a delta quantization parameter; and
    performing entropy encoding on the quantized data to generate output data of the video encoder.

15. The video processing method according to claim 9, wherein the spatial weighting factor, $w_s$, is determined as $$w_s = \frac{k_1 \sigma_{x,i}^2 + c_1}{\exp(\bar{s})},$$

where $\bar{s}$ is the global spatial attribute parameter, $\sigma_{x,i}^2$ is the variance of the pixel data in the i-th block of the target frame, and $k_1$ and $c_1$ are constants; and wherein the temporal weighting factor, $w_t$, is determined as $$w_t = \frac{k_2 \sigma_{xD,i}^2 + c_2}{\exp(\bar{t})},$$

where $\bar{t}$ is the global temporal attribute parameter, and $\sigma_{xD,i}^2$ is the variance of the absolute difference, and $k_2$ and $c_2$ are constants.

16. The video processing method according to claim 9, further comprising:

selecting a partition type for the i-th block of the target frame according to the modified Lagrange multiplier before the i-th block of the target frame is encoded.

17. A video processing method, adapted to a video encoder, comprising:

receiving an i-th block of a target frame partitioned into M blocks;

determining a temporal attribute parameter of an i-th block of the target frame in a pixel domain, wherein the temporal attribute parameter is dependent on the variance of an absolute difference between pixel data of the i-th block of the target frame and pixel data of a reference block, which is at the same position as the i-th block of the target frame, of a reference frame; and determining a modified Lagrange multiplier according to the temporal attribute parameter in the pixel domain, for encoding the i-th block of the target frame, wherein i and M are positive integers, and i is smaller than or equivalent to M, wherein the modified Lagrange multiplier, $\lambda_i$, is determined as the original Lagrange multiplier, $\lambda$, multiplied by a temporal weighting factor, $w_t$, of the i-th block of the target frame, as $\lambda_i = b * w_t * \lambda$, wherein b is a constant, wherein the temporal weighting factor, $w_t$, is determined according to the variance of the absolute difference and a global temporal attribute parameter being determined by an average of temporal attribute parameters of the M blocks of the target frame.

18. The video processing method according to claim 17, wherein determining the temporal attribute parameter of the i-th block of the target frame comprises:

determining the temporal attribute parameter of the i-th block of the target frame by performing arithmetic operations on a value, wherein the value is determined by searching a look up table based on a first value associated with the variance of the absolute difference;

wherein the temporal attribute parameter is a logarithmic approximation of the first value.

19. The video processing method according to claim 17, further comprising a step of:

determining a delta quantization parameter based on a difference between the temporal attribute parameter of the i-th block of the target frame and the global temporal attribute parameter.

20. The video processing method according to claim 19, wherein the delta quantization parameter, $\Delta QP$, is determined as:

$$\Delta QP = \frac{b\bar{t}(t_i - \bar{t})}{\bar{t}},$$

where $\bar{t}$ is the global temporal attribute parameter, and $t_i$ is the temporal attribute parameter of the i-th block of the target frame.

21. The video processing method according to claim 17, further comprising:

comparing the i-th block of the target frame with a prediction result with respect to the i-th block of the target frame to generate residual data for the i-th block;

transforming the residual data into transformed data;

quantizing the transformed data by using a quantization step to generate quantized data, wherein the quantization step is determined according to a quantization parameter adjusted by a delta quantization parameter; and performing entropy encoding on the quantized data to generate output data of the video encoder.

22. The video processing method according to claim 17, wherein the temporal weighting factor, $w_t$, is determined as $$w_t = \frac{k_2 \sigma_{xD,i}^2 + c_2}{\exp(\bar{t})},$$

where $\bar{t}$ is the global temporal attribute parameter, $\sigma_{xD,i}^2$ is the variance of the absolute difference, and $k_2$ and $c_2$ are constants.

23. The video processing method according to claim 17, further comprising:

selecting a partition type for the i-th block of the target frame according to the modified Lagrange multiplier before the i-th block of the target frame is encoded.

* * * * *